US009622101B1

(12) United States Patent
Mansour et al.

(10) Patent No.: US 9,622,101 B1
(45) Date of Patent: Apr. 11, 2017

(54) SYSTEM AND METHOD FOR PROTECTING TELECOMMUNICATIONS EQUIPMENT

(71) Applicant: SPRINT COMMUNICATIONS COMPANY, L.P., Overland Park, KS (US)

(72) Inventors: Nagi A. Mansour, Arlington, VA (US); Pinalkumari Tailor, Ashburn, VA (US); Yun Sung Kim, Ashburn, VA (US); Sandeep Padmakar Mangrulkar, Chantilly, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/996,986

(22) Filed: Jan. 15, 2016

(51) Int. Cl.
*H04W 24/08* (2009.01)
*H04W 4/06* (2009.01)
*H04W 72/04* (2009.01)

(52) U.S. Cl.
CPC ............ *H04W 24/08* (2013.01); *H04W 4/06* (2013.01); *H04W 72/0453* (2013.01)

(58) Field of Classification Search
CPC .... H04W 24/08; H04W 4/06; H04W 72/0453
See application file for complete search history.

(56) References Cited

U.S. PATENT DOCUMENTS

| 5,369,484 A * | 11/1994 | Haugen ................ G01N 21/274 356/326 |
| 6,058,487 A * | 5/2000 | Isoda ..................... G01R 23/10 713/502 |
| 8,665,936 B2 * | 3/2014 | Elliott ............... H04L 25/03343 375/224 |
| 2013/0052959 A1 * | 2/2013 | Rubin .................. H04W 24/08 455/67.11 |
| 2015/0349840 A1 * | 12/2015 | Zhang ................. H04B 15/005 455/77 |

* cited by examiner

Primary Examiner — Kashif Siddiqui

(57) ABSTRACT

A system for broadcasting a telecommunications signal is configured to detect the use of an improper filter, and/or also, the presence of an improper return signal from a filter. The system includes a broadcast cell having a signal generation component and a signal transmitting component, a filter through which the signal generated by the signal generation component is sent, and a directional coupler that diverts a portion of a return signal reflected from the filter back to the broadcast cell away from the broadcast cell to a detector, the detector configured to determine when the return signal is at least a minimum level, or within a range, that indicates use of an improper filter or the presence of an improper return signal, allowing modification of the system or notification of the conditions, in certain circumstances.

20 Claims, 5 Drawing Sheets

SYSTEM AND METHOD FOR PROTECTING TELECOMMUNICATIONS EQUIPMENT

TECHNICAL FIELD

The field of the invention relates to telecommunications signal broadcasting.

BACKGROUND

A telecommunications broadcast cell generates a signal which is transmitted over a wireless communications network. The broadcast cell often utilizes one or more filters through which the signal is sent to modify the signal prior to emission of the signal over the network. A return signal is often reflected from the filter back towards the broadcast cell, or a signal generation component thereof, during operation. When an improper filter is used with the broadcast cell, the return signal may spike and be larger than what the broadcast cell is configured to handle during operation, and as a result, the broadcast cell may be damaged or otherwise negatively affected. Thus, an improved method and system for detecting the use of an improper filter and/or the presence of an improper return signal in a broadcast cell is needed.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in determining the scope of the claimed subject matter. The scope of the invention is defined by the claims.

In brief, and at a high level, this disclosure describes, among other things, methods, systems, and devices for detecting when an improper filter is used with a broadcast cell, and/or also, for detecting when an improper return signal is reflected back to a broadcast cell from a filter. In an exemplary embodiment, a broadcast cell is configured to broadcast a signal. The signal passes through a filter to modify the signal. A portion of the signal is reflected from the filter back to the broadcast cell as a return signal. A directional coupler is provided that diverts a portion of the return signal away from the broadcast cell to a detector that can detect and/or analyze the portion of the return signal to determine if an improper filter is in use, and/or also, to determine if an improper return signal is being reflected to the broadcast cell. In response, a number of modifications may occur to limit the negative effects of the improper filter and/or the improper return signal.

In one embodiment, a system for identifying improper filters is provided, in accordance with an embodiment of the present invention. The system comprises a broadcast cell configured to broadcast a signal comprising a frequency range, a filter through which the signal passes, and a directional coupler that diverts a portion of a return signal from the filter to the broadcast cell away from the broadcast cell to a detector, the detector monitoring the portion of the return signal to determine if a proper filter is in use based on the detector detecting a first minimum level or range of return signal associated with use of the proper filter, or an improper filter is in use based on the detector detecting a second minimum level or range of return signal associated with use of the improper filter.

In another embodiment, a system for broadcasting telecommunications signals that detects the use of improper filters is provided, in accordance with an embodiment of the present invention. The system comprises a broadcast cell configured to broadcast a signal, the signal comprising a first frequency range and a second frequency range, a first filter through which the first frequency range passes, a second filter through which the second frequency range passes, a first directional coupler that diverts a portion of a first return signal from the first filter away from the broadcast cell to a first detector, and a second directional coupler that diverts a portion of a second return signal from the second filter away from the broadcast cell to a second detector. The first detector monitors a level of the first return signal to determine if the level of the first return signal is at least a preconfigured minimum level that indicates use of an improper first filter. The second detector monitors a level of the second return signal to determine if the level of the second return signal is at least a preconfigured minimum level that indicates use of an improper second filter.

In a third embodiment, a method for detecting improper return signals in telecommunications equipment is provided, in accordance with an embodiment of the present invention. The method comprises providing a broadcast cell configured to broadcast a signal comprising a first frequency range, providing a filter, broadcasting the signal from the broadcast cell, at least a portion of the first frequency range of the signal passing through the filter, and providing a directional coupler that diverts a portion of a return signal from the filter away from the broadcast cell to a detector. The method further comprises providing the detector, the detector configured to detect a level of the return signal associated with use of an improper filter. The method further comprises diverting, using the directional coupler, the portion of the return signal from the filter away from the broadcast cell to the detector, and detecting, using the detector, whether the return signal is at least a preconfigured minimum level associated with use of the improper filter.

As used in this disclosure, the term "broadcast cell" means any component, system, or assembly that is configured to generate and/or broadcast a telecommunications signal over a wireless communications network, and may comprise an antenna, radio, and/or other signal generation, modification, or transmitting components. The broadcast cell may be a femtocell, a picocell, a microcell, a macrocell, a low-cost internet base station (LCIB), a mini-macro cell, or the like, and is not limited to one particular type of broadcast cell, including one having any specific inclusion of components. As used in this disclosure, the term "filter" means any device or component through which a signal emitted by a broadcast cell may pass to modify the signal ultimately emitted by the broadcast cell.

BRIEF DESCRIPTION OF THE DRAWINGS

The present invention is described in detail below with reference to the attached figures, which provide exemplary embodiments, wherein.

DETAILED DESCRIPTION

The subject matter of the present invention is described with specificity in this disclosure to meet statutory requirements. However, the description itself is not intended to limit the scope of the claims or the invention. Rather, the claimed subject matter might be embodied in other ways, to include different steps or combinations of steps, similar to the ones described in this document, and in conjunction with other present or future technologies. Moreover, although the terms "step" and/or "block" may be used to identify different elements of methods employed, the terms should not be interpreted as implying any particular order among or between various steps or blocks unless and except when the order of individual steps or blocks is explicitly described and required.

At a high level, the present invention generally relates to systems, methods, and devices for detecting when an improper filter is used with a broadcast cell, as well as for detecting when an improper return signal is reflected from a filter back to the broadcast cell. Further, the systems, methods, and devices described herein may allow for notification, as well as modification to the system, upon detection of an improper filter or an improper return signal, to limit or reduce undesired effects of the improper filter or improper return signal.

Figure 1:
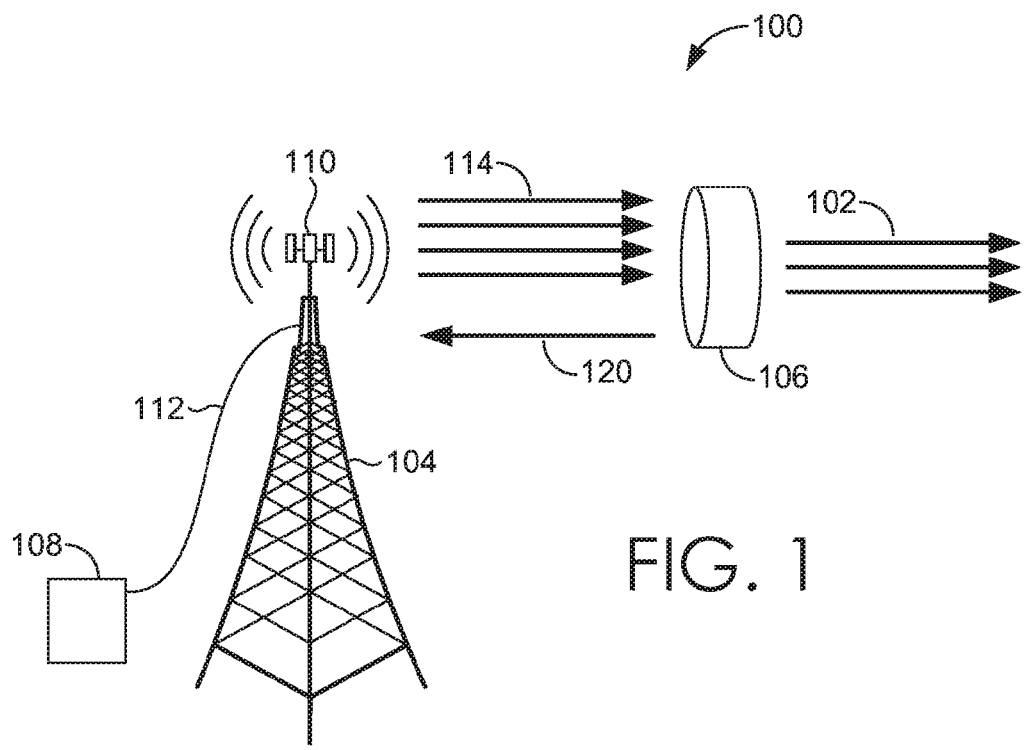
FIG. 1 is an exemplary telecommunications system, in accordance with an embodiment of the present invention.

Referring now to FIG. 1, an exemplary telecommunications system 100 for broadcasting a signal 102 over a wireless communications network is provided, in accordance with an embodiment of the present invention. In FIG. 1, the system 100 includes a broadcast cell 104 and a filter 106. Further, the broadcast cell 104 includes a signal generation component 108 (e.g., a radio) and a signal transmitting component 110 (e.g., an antenna). The signal generation component 108 may be integrated with the signal transmitting component 110, or separate and connected by a signal path 112, as shown in FIG. 1, depending on the configuration of the broadcast cell 104. The configuration of the system 100 shown in FIG. 1 is exemplary, and many other configurations are possible and contemplated.

In FIG. 1, the filter 106 is coupled to the broadcast cell 104, but is shown separate from the broadcast cell 104 for clarity purposes. The filter 106 may be positioned anywhere in the signal path 112 from the signal generation component 108 to the signal transmitting component 110, so that the filter 106 is able to modify a pre-filter signal 114 generated by the broadcast cell 104, such as at the signal generation component 108. The filter 106 may be used to eliminate signal interference, noise, and/or reduce or eliminate a portion of a frequency range of the pre-filter signal 114 passing through the filter 106 so that only a selected frequency range or data signal is emitted from the broadcast cell 104 over the network. Any number of filter types and signal modifications are possible and contemplated.

As shown in FIG. 1, the system 100 may be configured such that during operation, the signal 102 emitted over the wireless communications network only contains a portion of the pre-filter signal 114. In this respect, a portion of the frequency range has been removed or reduced by the filter 106 to reduce interference, and a portion of the pre-filter signal 114 is reflected back to the broadcast cell 104 by the filter 106 as a return signal 120. The return signal 120 may be present in some amount during operation of the broadcast cell 104, but through selection of the filter 106, and configuration of the signal generation component 108, the return signal 120 may be a level which the broadcast cell 104, or a component thereof such as the signal generation component 108, is configured to handle during operation.

Figure 2:
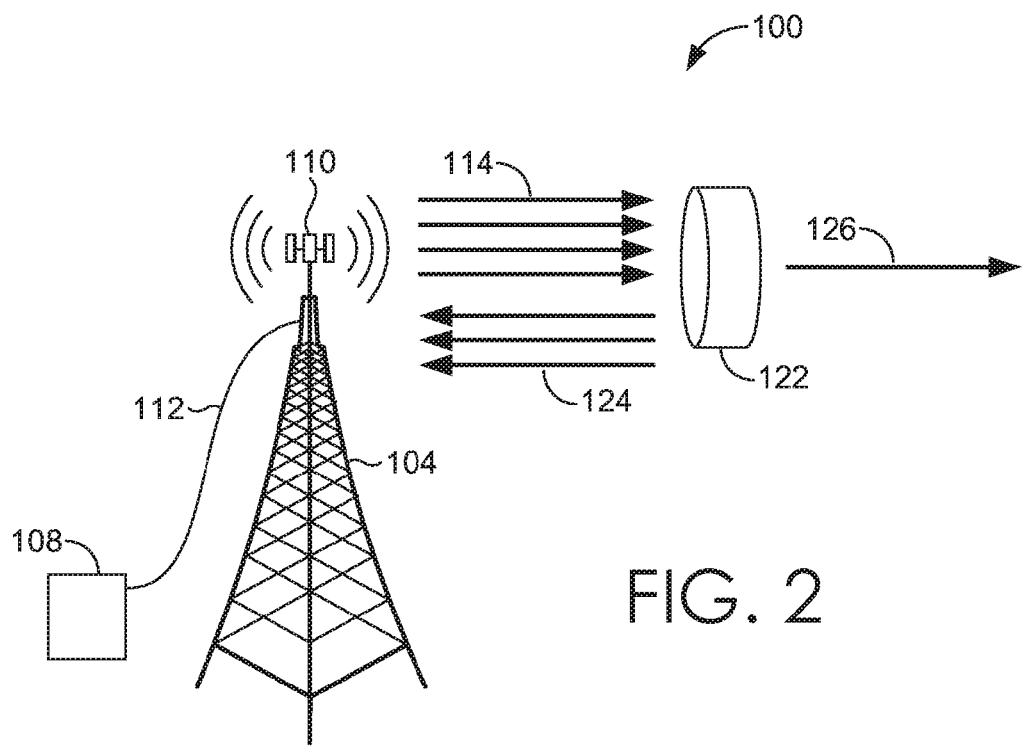
FIG. 2 is the exemplary telecommunications system of FIG. 1 with an improper filter in use with the system, in accordance with an embodiment of the present invention.

As shown in FIG. 2, when an improper filter 122 that is not configured for the particular signal characteristics of the pre-filter signal 114 from the broadcast cell 104 (e.g., reduces the wrong frequency range or causes another improper effect) is installed, an improper return signal 124 may be reflected to the broadcast cell 104 or a component thereof. This improper return signal 124 may cause undesirable effects, such as damage to components of the broadcast cell 104, reduced performance of the broadcast cell 104, or other negative effects. For example, during operation of the system 100, 1% of the pre-filter signal 114 may be reflected by the proper filter 106 to the broadcast cell 104. When an improper filter 122 is installed, the return signal may instead be 2%, 10%, or some other amount. The improper return signal 124 may reach or exceed a level, or enter a range, that warrants indication or adjustment. This level may be user-configurable and/or pre-established.

Installation of the improper filter 122, which produces the improper return signal 124, may generate negative effects, including degradation of the signal from the broadcast cell 104, overloading of components of the broadcast cell 104, damage to the broadcast cell 104, or other negative or undesirable effects. As a result, detecting when the improper filter 122 is installed or is in use allows action that limits the negative effects to the system 100. For example, limiting or preventing the improper return signal 124 from reaching the broadcast cell 104 is one possible response.

Referring now to FIG. 2, the system 100 of FIG. 1, with an improper filter 122 installed, is provided, in accordance with an embodiment of the present invention. As in FIG. 1, a portion of the pre-filter signal 114 from the broadcast cell 104 is reflected from the improper filter 122 back to the broadcast cell 104 as the improper return signal 124, and a portion of the pre-filter signal 114 is emitted from the improper filter 122 as the signal 126. In contrast to FIG. 1, the improper filter 122 has produced an improper return signal 124 that is spiked. This may affect the performance, quality, or integrity of the broadcast cell 104. Once again, the improper filter 122 in FIG. 2 is shown distinct from the broadcast cell, but may be integrated into the broadcast cell 104.

Figure 3:
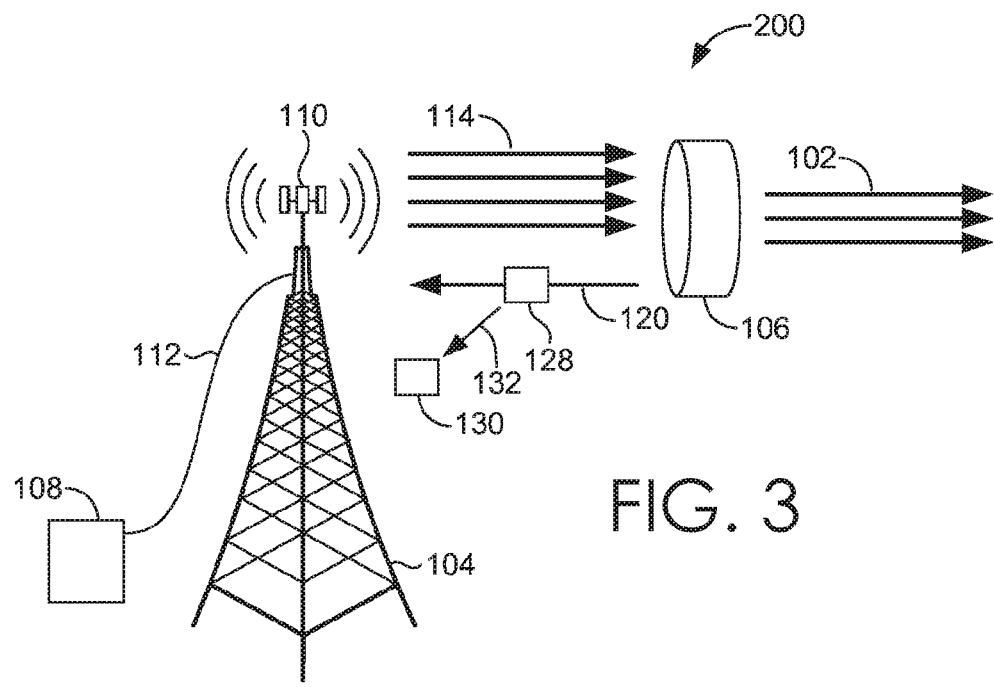
FIG. 3 is an exemplary telecommunications system configured for detecting use of an improper filter and/or an improper return signal, with a proper filter installed, in accordance with an embodiment of the present invention.

Referring now to FIG. 3, an exemplary telecommunications system 200 for detecting use of an improper filter and/or for detecting the presence of an improper return signal is provided, in accordance with an embodiment of the present invention. In FIG. 3, once again, the system 200 includes the broadcast cell 104, including the signal generation component 108 and the signal transmitting component 110, and the filter 106. The filter 106 is shown distinct from the broadcast cell 104 for clarity purposes. The system 200 in FIG. 3 includes a proper filter 106 that reflects a proper return signal 120 to the broadcast cell 104.

The system 200 in FIG. 3 also includes a directional coupler 128 and a detector 130. The directional coupler 128 and the detector 130 are shown distinct from the broadcast cell 104 and filter 106 for clarity, but in implementation, these components may be integrated or coupled with any of the other components in any suitable arrangement. In FIG. 3, the directional coupler 128 receives, diverts, and/or directs, a portion 132 of the return signal 120 reflected from the filter 106 to the broadcast cell 104, or to a component within the broadcast cell 104, such as the signal generation component 108. This portion 132 of the return signal 120 may be received, measured, and/or analyzed by the detector 130. The detector 130 may determine the signal power, amplitude, frequency, and/or other signal characteristics of the portion 132 of the return signal 120 to determine if an improper return signal is present, and/or also, if an improper filter has been installed.

The detector 130 may calculate through comparative, ratio, or other mathematical analysis, the level of the full return signal 120 from the diverted portion 132 of the return signal 120. For example, if the directional coupler 128 is configured to divert $1/10^{th}$ of the return signal to the detector 130, the detector 130 can utilize the $1/10^{th}$ of the return signal 120, and multiply the $1/10^{th}$ of the return signal by 10 to determine the return signal 120 reflected from the filter 106 to the broadcast cell 104.

The detector 130 may be configured to monitor the level of the return signal 120 using the analysis described for spikes, preconfigured minimum levels or ranges, or other changes or qualities that may indicate that an improper filter 122 is in use, or that the return signal 120 is otherwise improper for the current configuration of the broadcast cell 104 (e.g., the return signal 120 has exceed a minimum predetermined threshold in response to which a modification or shutdown to protect components of the broadcast cell 104 may be preferable). In the exemplary embodiment shown in FIG. 3, the return signal 120 is at a predetermined acceptable level.

Figure 4:
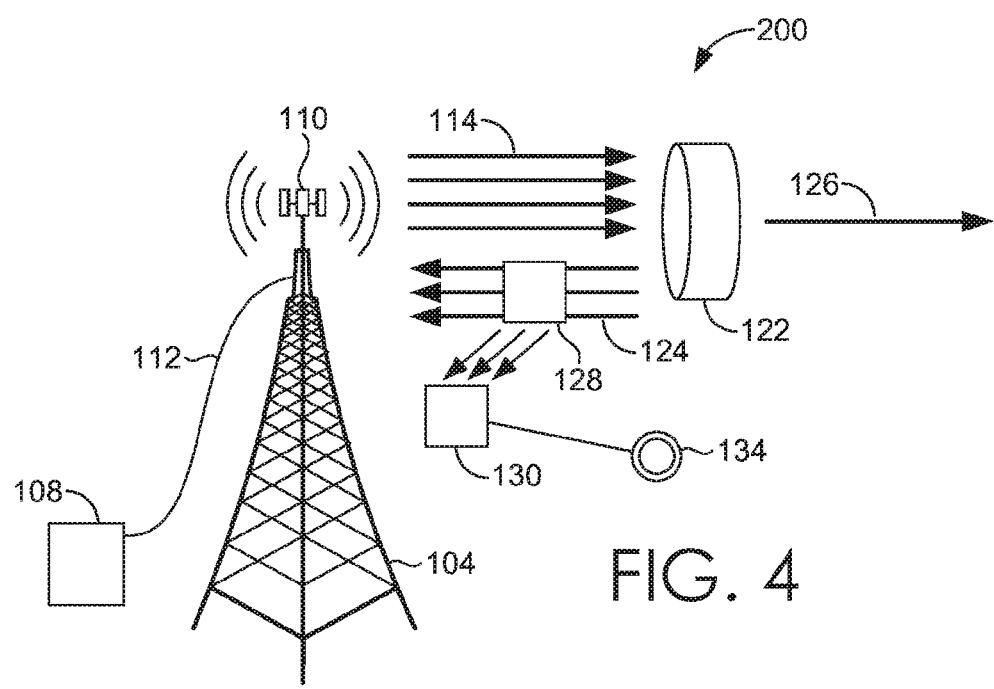
FIG. 4 is the exemplary system shown in FIG. 3, with an improper filter installed, in accordance with an embodiment of the present invention.

Referring now to FIG. 4, the exemplary system 200 shown in FIG. 3, with an improper filter 122 installed, is provided, in accordance with an embodiment of the present invention. In FIG. 4, once again, the broadcast cell 104 includes the signal generation component 108 and the signal transmitting component 110, the directional coupler 128, and the detector 130. Additionally, the improper filter 122 is installed. As a result, the improper return signal 124 is much larger than the return signal 120 from the proper filter 106 shown in the system 200 in FIG. 3. Additionally, the pre-filter signal 114 is also not being properly modified by the improper filter 122. This could, for example, be caused by the improper filter 122 blocking out the wrong frequencies, or another mismatch in the system configuration.

The level or range of the improper return signal 124 that will trigger the detector 130 to indicate that the improper filter 122 is in use, and/or indicate that a change should be made, may be predetermined based on the components used and/or desired operating parameters. For example, if the detector 130 detects a minimum level of return signal (through computational analysis of a diverted portion of the improper return signal 124), the detector may indicate that a response should be made. The response may comprise diverting, blocking, or restricting the improper return signal 124 from reaching the broadcast cell 104, or shutting down the broadcast cell 104 so that no pre-filter signal 114 is generated, placing the broadcast cell 104 in a holding pattern, or another response, which may be carried out manually or autonomously by computer or a controller.

Additionally, as shown in FIG. 4, once it is detected or determined that an improper return signal 124 and/or an improper filter 122 is present, an indication may be provided at the detector 130, or at an indicating component 134 communicatively coupled to the detector 130, for an operator. This component may provide an indication that is electronic, visual, audible, or some other form of electronic or physical indication. For example, a light emitting component, such as a diode, may illuminate to indicate to an operator that the improper filter or improper return signal is present. Alternatively, the indicating component 134 may be remotely located but communicatively coupled to the detector 130.

Figure 5:
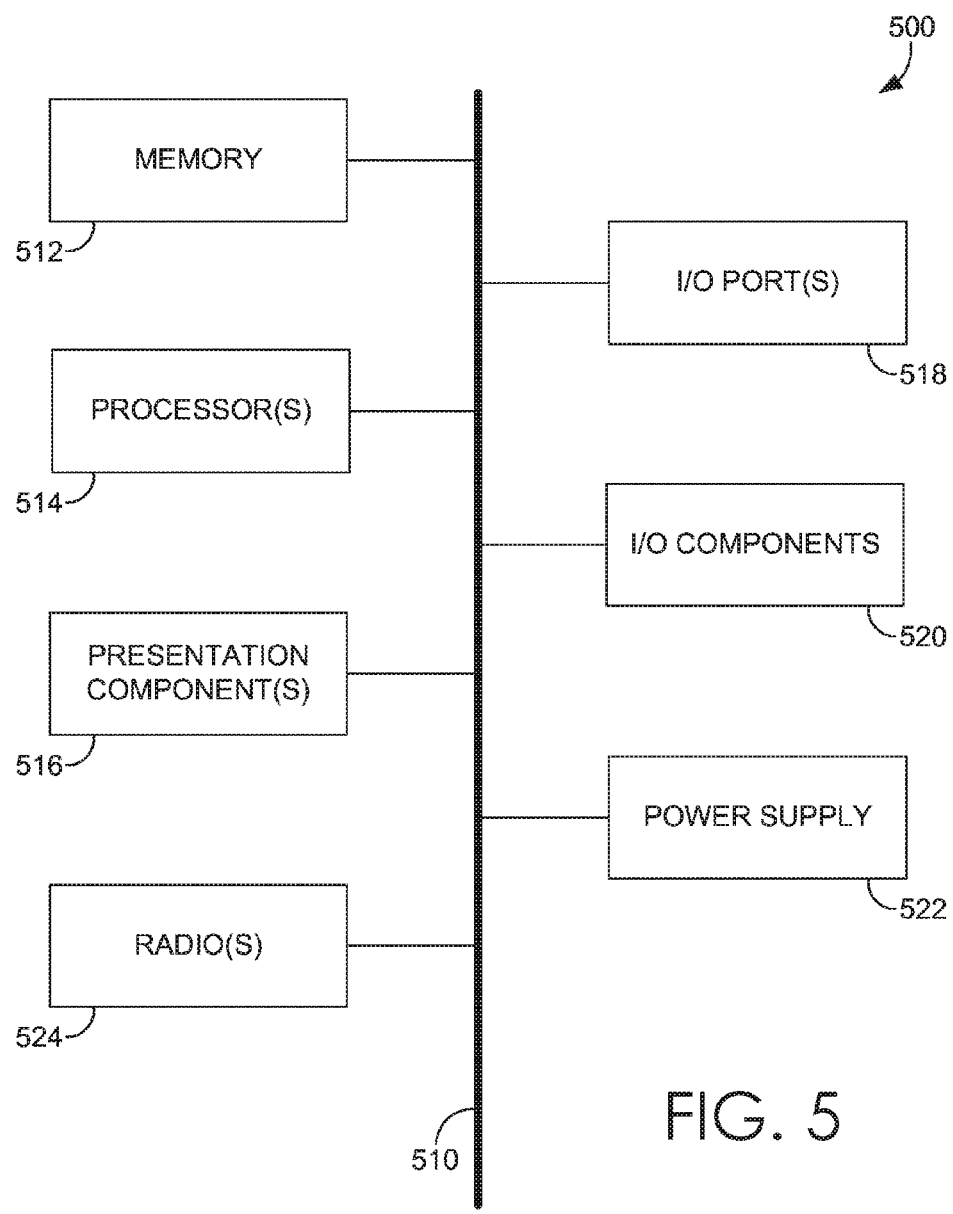
FIG. 5 is an exemplary computer environment which may be used with a system for detecting improper filters and improper return signals, in accordance with an embodiment of the present invention.

Referring now to FIG. 5, an exemplary operating environment which can be used for implementing embodiments described herein is shown and designated generally as computing device 500, in accordance with an embodiment of the present invention. Computing device 500 is but one example of a suitable computing environment and is not intended to suggest any limitation as to the scope of use or functionality of the invention. Neither should the computing device 500 be interpreted as having any dependency or requirement relating to any one or a combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in any variety of system configurations, including hand-held devices, consumer electronics, general-purpose computers, and more specialty computing devices, among others. The invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output (I/O) ports 518, I/O components 520, and an illustrative power supply 522. Bus 510 represents what may be one or more busses (such as an address bus, data bus, or a combination thereof). Although the various blocks of FIG. 5 are shown with lines for the sake of clarity, in reality, delineating various components is not as clear, and metaphorically, the lines are blurred. For example, one may consider a presentation component such as a display device to be an I/O component. Also, processors have memory. The diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated as within the scope of FIG. 5 and when referencing the "computing device."

Computing device 500 may include a variety of computer-readable media and/or computer storage media. Computer-readable media may be any available media that can be accessed by computing device 500 and includes both volatile and nonvolatile media, removable and non-removable media. By way of example and not limitation, computer-readable media may comprise computer storage media and communication media and/or devices. Computer storage media may include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. These memory components can store data momentarily, temporarily, or permanently. Computer storage media does not include signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 512 includes computer storage media in the form of volatile and/or non-volatile memory. The memory may be removable, non-removable, or a combination thereof. Exemplary hardware devices include solid-state memory, hard drives, optical-disc drives, etc. Computing device 500 includes one or more processors 514 that read data from various entities such as memory 512 or I/O components 520. Presentation component(s) 516 present data indications to a user or other device. Exemplary presentation components include a display device, speaker, printing component, vibrating component, etc. I/O ports 518 allow computing device 500 to be logically coupled to other devices including I/O components 520, some of which may be built-in. Illustrative components include a microphone, joystick, game pad, satellite dish, scanner, printer, wireless device, and the like.

Embodiments of the technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media or devices.

Figure 6:
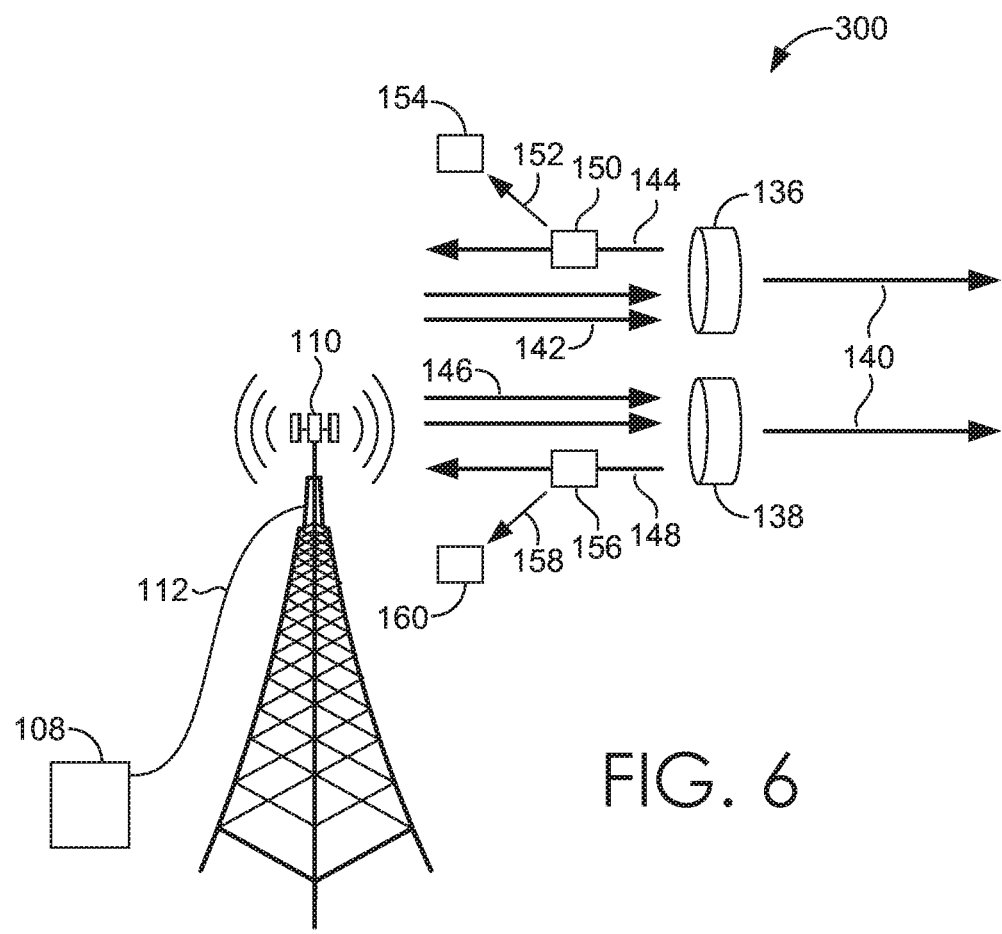
FIG. 6 is an exemplary telecommunications system for detecting use of an improper filter and/or the presence of an improper return signal, the system utilizing multiple filters, in accordance with an embodiment of the present invention.

Referring now to FIG. 6, an exemplary telecommunications system 300 for detecting use of an improper filter and/or the presence of an improper return signal, with multiple filters in use, is provided, in accordance with an embodiment of the present invention. In FIG. 6, like in FIGS. 3 and 4, a broadcast cell 104 is provided that includes a signal generation component 108 and a signal transmitting component 110. Additionally, first and second filters 136, 138 are coupled to the broadcast cell 104, and are shown distinct from the broadcast cell 104 for clarity but may be integrated with the broadcast cell 104.

The signal 140 generated by the broadcast cell 104 may comprise multiple frequency ranges, such as a first, second, and third frequency ranges that comprise distinct frequency bands. Selected frequency ranges, such as the first and third frequency ranges (e.g., a lower frequency range and a higher frequency range, relatively speaking) may be sent through respective filters 136, 138, which may be selected for a specific modification of the corresponding first and third frequency ranges. For example, the first frequency range forming a first pre-filter signal 142 may be directed through the first filter 136, returning a first return signal 144 to the broadcast cell 104. The second frequency range forming a second pre-filter signal 146 may be directed through the second filter 138, returning a second return signal 148 to the broadcast cell 104. In FIG. 6, each filter in the system 300 is a properly selected filter that can be utilized by the broadcast cell 104 during operation, without an undesired spike in return signal.

As shown in FIG. 6, the first return signal 144 goes through a first directional coupler 150 and a portion 152 of the first return signal 144 is directed to a first detector 154, which monitors for an improper signal and/or an improper filter, and the second return signal 148 goes through a second directional coupler 156 and a portion 158 of the second return signal 148 is directed to a second detector 160, which monitors for an improper signal and/or an improper filter. Multiple filters, directional couplers, detectors, and other components are possible for modifying and/or monitoring selected emission bands of the broadcast cell 104.

Figure 7:
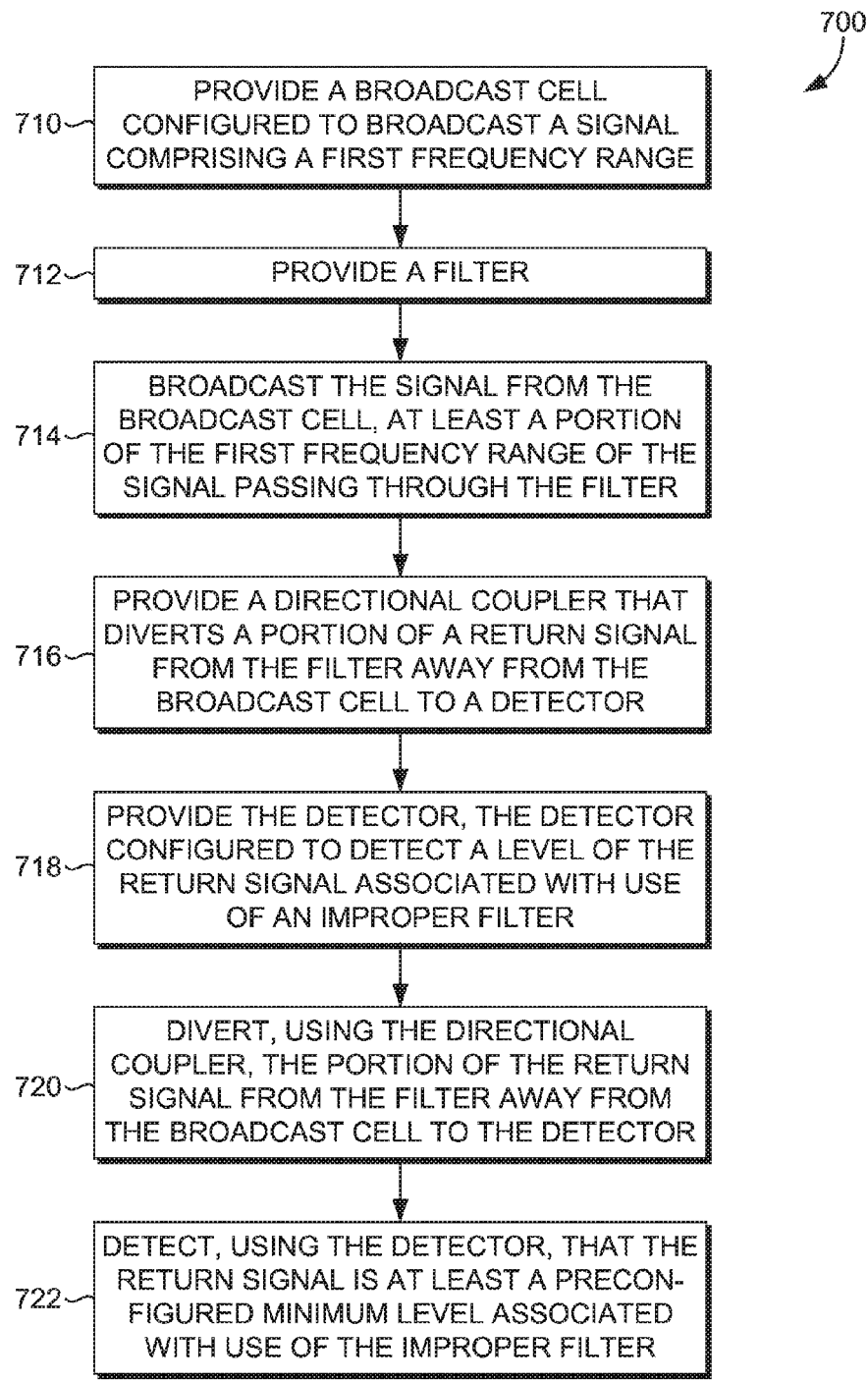
FIG. 7 is a block diagram of an exemplary method of detecting use of an improper filter and/or the presence of an improper return signal, in accordance with an embodiment of the present invention.

Referring now to FIG. 7, a block diagram of an exemplary method 700 for detecting use of an improper filter with a telecommunications system, such as the system 200 shown in FIG. 3, is provided, in accordance with an embodiment of the present invention. At a block 710, a broadcast cell, such as the broadcast cell 104 shown in FIG. 3, is configured to broadcast a signal comprising a first frequency range. At a block 712, a filter, such as the filter 106, is provided. At a block 714, the signal is broadcast from the broadcast cell, with at least a portion of the first frequency range of the signal passing through the filter. At a block 716, a directional coupler, such as the directional coupler 128 shown in FIG. 3, is provided that diverts a portion, such as the portion 132 shown in FIG. 3, of a return signal, such as the return signal 120 shown in FIG. 3, from the filter away from the broadcast cell to a detector, such as the detector 130 shown in FIG. 3.

At a block 718, the detector is provided, the detector configured to detect a level of the return signal associated with use of an improper filter, such as the improper filter 122. At a block 720, the portion of the return signal is diverted, using the directional coupler, from the filter away from the broadcast cell to the detector. At a block 722, the detector detects that the return signal is at least a preconfigured minimum level associated with use of the improper filter.

The present technology has been described in relation to particular embodiments, which are intended in all respects to be illustrative rather than restrictive. Alternative embodiments will become apparent to those of ordinary skill in the art to which the present invention pertains without departing from its scope.

What is claimed is:

1. A system for identifying improper filters, the system comprising:
   a broadcast cell configured to broadcast a signal comprising a frequency range;
   a filter through which the signal passes; and
   a directional coupler that diverts a portion of a return signal from the filter to the broadcast cell away from the broadcast cell to a detector, the detector monitoring the portion of the return signal to determine if:

a proper filter is in use based on the detector detecting a first level or range of return signal associated with use of the proper filter, or an improper filter is in use based on the detector detecting a second level or range of return signal associated with use of the improper filter.

2. The system of claim 1, wherein the frequency range is divided into a first frequency range, a second frequency range, and a third frequency range, wherein the second frequency range is higher than the first frequency range, wherein the third frequency range is higher than the second frequency range, and wherein only the first frequency range or the third frequency range is sent through the filter to reduce interference associated with a portion of the first frequency range or the third frequency range which is sent through the filter.

3. The system of claim 2, wherein detecting the first or the second level or range of return signal comprises measuring, by the detector, a level of the portion of the return signal diverted to the detector, and multiplying the level of the portion of the return signal diverted to the detector by a factor that equates the level of the portion of the return signal diverted to the detector to a level of the return signal reflected to the broadcast cell.

4. The system of claim 3, wherein the level of the portion of the return signal diverted to the detector comprises a maximum of $\frac{1}{10}^{th}$ of the level of the return signal reflected to the broadcast cell.

5. The system of claim 3, wherein the system further comprises an illuminable element communicatively coupled to the detector that illuminates when the detector determines that the improper filter is in use.

6. The system of claim 3, wherein the directional coupler is positioned along a signal path between the broadcast cell and the filter, and wherein the filter blocks out a range of frequencies associated with the first frequency range or the second frequency range sent through the filter.

7. The system of claim 3, wherein the system is configured to, upon determining that the improper filter is in use, perform at least one of:
diverting the return signal away from the broadcast cell;
blocking the return signal from reaching the broadcast cell; and
shutting down or reducing power from the broadcast cell.

8. The system of claim 3, wherein the second level or range of return signal is user configurable, and wherein the filter reduces frequency interference associated with an outgoing signal from the broadcast cell.

9. The system of claim 3, wherein the broadcast cell is:
a macrocell;
a microcell; or
a mini-macro cell.

10. A system for broadcasting telecommunications signals that detects the use of improper filters, the system comprising:
a broadcast cell configured to broadcast a signal, the signal comprising a first frequency range and a second frequency range;
a first filter through which the first frequency range passes;
a second filter through which the second frequency range passes;
a first directional coupler that diverts a portion of a first return signal from the first filter away from the broadcast cell to a first detector; and a second directional coupler that diverts a portion of a second return signal from the second filter away from the broadcast cell to a second detector,
wherein the first detector monitors a level of the first return signal to determine if the level of the first return signal is at least a preconfigured minimum level that indicates use of an improper first filter, and
wherein the second detector monitors a level of the second return signal to determine if the level of the second return signal is at least a preconfigured minimum level that indicates use of an improper second filter.

11. The system of claim 10, wherein the system is further configured to, upon determining that the first return signal is at least the preconfigured minimum level that indicates use of the improper first filter, prevent the first return signal from reaching the broadcast cell, and is further configured to, upon determining that the second return signal is at least the preconfigured minimum level that indicates use of the improper second filter, prevent the second return signal from reaching the broadcast cell.

12. The system of claim 10, wherein the first detector and the second detector are each configurable to define a minimum level of return signal that indicates use of a respective improper filter.

13. The system of claim 10, wherein the first filter and the second filter provide different signal modification characteristics.

14. The system of claim 13, wherein reducing interference comprises eliminating a portion of the first and second frequency ranges emitted from the respective first and second filters.

15. The system of claim 10, further comprising a first visual indicator coupled to the first detector and a second visual indicator coupled to the second detector, wherein the first and second visual indicators are configured to visually indicate when an improper filter is used with the respective first and second frequency ranges.

16. A method for detecting improper return signals in telecommunications equipment, the method comprising:
providing a broadcast cell configured to broadcast a signal comprising a first frequency range;
providing a filter;
broadcasting the signal from the broadcast cell, at least a portion of the first frequency range of the signal passing through the filter;
providing a directional coupler that diverts a portion of a return signal from the filter away from the broadcast cell to a detector;
providing the detector, the detector configured to detect a level of the return signal associated with use of an improper filter;
diverting, using the directional coupler, the portion of the return signal from the filter away from the broadcast cell to the detector; and
detecting, using the detector, whether the return signal is at least a preconfigured minimum level associated with use of the improper filter.

17. The method of claim 16, further comprising indicating that the improper filter is in use.

18. The method of claim 17, wherein upon determining that the return signal is at least the preconfigured minimum level, preventing the return signal from reaching the broadcast cell.

19. The method of claim 18, wherein detecting that the return signal is at least the preconfigured minimum level comprises measuring a level of the portion of the return signal and using ratio analysis to compute a corresponding level of the return signal.

20. The method of claim 17, further comprising providing a visual indication when the detector determines that the return signal is at least the preconfigured minimum level.

* * * * *